United States Patent
Yeh (10) Patent No.: US 10,630,542 B2
(45) Date of Patent: Apr. 21, 2020

(54) METHOD FOR AUTOMATICALLY INITIALIZING NETWORK DEVICE, REMOTE SERVER AND NETWORK SYSTEM USING THE SAME

(71) Applicant: Industrial Technology Research Institute, Hsinchu (TW)

(72) Inventor: Shu-Chun Yeh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 110 days.

(21) Appl. No.: 16/053,810

(22) Filed: Aug. 3, 2018

(65) Prior Publication Data
US 2019/0140897 A1 May 9, 2019

(30) Foreign Application Priority Data
Nov. 6, 2017 (TW) .............................. 106138322 A (51) Int. Cl.
*H04L 12/24* (2006.01)
*G06F 9/4401* (2018.01)
(Continued)

(52) U.S. Cl.
CPC ........ *H04L 41/0806* (2013.01); *G06F 9/4416* (2013.01); *H04L 41/12* (2013.01);
(Continued)

(58) Field of Classification Search
CPC .................................................. H04L 41/0806
(Continued)

(56) References Cited

U.S. PATENT DOCUMENTS

| 6,711,171 B1 * | 3/2004 | Dobbins ............. H04L 12/1886 370/400 |
| 6,871,210 B1 | 3/2005 | Subramanian |

(Continued)

FOREIGN PATENT DOCUMENTS

| CN | 101478386 | 7/2009 |
| CN | 100536482 | 9/2009 |

(Continued)

OTHER PUBLICATIONS

"Office Action of Taiwan Counterpart Application," dated Jul. 29, 2019, p. 1-p. 14.

(Continued)

*Primary Examiner* — Ondrej C Vostal
(74) *Attorney, Agent, or Firm* — JCIPRNET (57) ABSTRACT

A method for automatically initializing a network device, a remote server, and a network system using the method are provided. The remote server is connected to a switch via a network. The remote server obtains a port number of a port at which the network device is connected to the switch and a forwarding table from the switch. The remote server analyzes the forwarding table according to the port number of the port at which the network device is connected to the switch to obtain an identifier of a remote management controller of the network device. The remote server assigns and transmits a network address of the remote management controller to the remote management controller of the network device according to the identifier of the remote management controller.

31 Claims, 5 Drawing Sheets

(51) Int. Cl.
    *H04L 12/741* (2013.01)
    *H04L 12/721* (2013.01)
    *H04L 29/12* (2006.01)

(52) U.S. Cl.
    CPC ............ *H04L 45/26* (2013.01); *H04L 45/745* (2013.01); *H04L 61/103* (2013.01); *H04L 61/2015* (2013.01); *H04L 61/6022* (2013.01)

(58) Field of Classification Search
    USPC ........................................................ 709/222
    See application file for complete search history.

(56) References Cited

U.S. PATENT DOCUMENTS

| | | | | |
|---|---|---|---|---|
| 7,035,257 | B2* | 4/2006 | Vafaei | H04L 29/06 370/389 |
| 7,831,997 | B2 | 11/2010 | Eldar et al. | |
| 9,354,905 | B2* | 5/2016 | Nakagawa | G06F 9/455 |
| 9,438,479 | B1* | 9/2016 | Friedman | H04L 41/12 |
| 2005/0018651 | A1* | 1/2005 | Yan | H04L 29/06027 370/352 |
| 2008/0304458 | A1* | 12/2008 | Aghvami | H04L 69/08 370/338 |
| 2009/0196290 | A1 | 8/2009 | Zhao et al. | |
| 2010/0115113 | A1* | 5/2010 | Short | H04L 63/08 709/228 |
| 2010/0142371 | A1* | 6/2010 | Gooch | H04L 43/026 370/229 |
| 2012/0063458 | A1* | 3/2012 | Klink | H04L 29/12367 370/392 |
| 2012/0297037 | A1 | 11/2012 | Kumagai et al. | |
| 2013/0103817 | A1* | 4/2013 | Koponen | H04L 47/825 709/223 |
| 2013/0117426 | A1* | 5/2013 | Saraiya | G06F 13/387 709/222 |
| 2014/0313931 | A1* | 10/2014 | Roper | H04L 45/66 370/254 |
| 2014/0314086 | A1* | 10/2014 | Roper | H04L 45/745 370/392 |
| 2015/0222592 | A1 | 8/2015 | Andrews | |
| 2016/0080315 | A1 | 3/2016 | Anggawijaya et al. | |
| 2016/0248619 | A1 | 8/2016 | Itkin | |
| 2017/0201419 | A1 | 7/2017 | Garcia et al. | |
| 2019/0190885 | A1* | 6/2019 | Krug | H04L 61/2517 |

FOREIGN PATENT DOCUMENTS

| | | |
|---|---|---|
| CN | 104219099 | 12/2014 |
| JP | 2010147553 | 7/2010 |
| JP | 2010239597 | 10/2010 |
| TW | 201316739 | 4/2013 |
| TW | 201546714 | 12/2015 |

OTHER PUBLICATIONS

"Office Action of Japan Counterpart Application," dated Sep. 17, 2019, p. 1-p. 5.

"Office Action of Taiwan Counterpart Application," dated Aug. 29, 2018, pp. 1-22.

Yuri Demchenko et al., "Enabling Automated Network Services Provisioning for Cloud Based Applications Using Zero Touch Provisioning", 2015 IEEE/ACM 8th International Conference on Utility and Cloud Computing, Dec. 2015, pp. 458-464.

Jerry Ash et al., "AT&T's MPLS OAM Architecture, Experience, and Evolution", IEEE Communications Magazine, Oct. 2004, pp. 100-111.

Iztok Marjanovic et al., "Design and Implementation of a Self-Configuring Instrument Control System", Ninth IEEE International Symposium on Parallel and Distributed Processing with Applications Workshops, May 2011, pp. 165-170.

Sonja Filiposka et al., "Enabling High Performance Cloud Computing Using Zero Touch Provisioning", 23rd Telecommunications forum TELFOR 2015, Nov. 2015, pp. 67-70.

Yuri Demchenko et al., "ZeroTouch Provisioning (ZTP) Model and Infrastructure Components for Multi-provider Cloud Services Provisioning", 2016 IEEE International Conference on Cloud Engineering Workshop, Apr. 2016, pp. 184-189.

Amit Dutta et al., "Simplifying Device Provisioning with NG Plug and Play", Cisco TechAdvantage Webinars, May 2015, pp. 1-51.

* cited by examiner

METHOD FOR AUTOMATICALLY INITIALIZING NETWORK DEVICE, REMOTE SERVER AND NETWORK SYSTEM USING THE SAME

CROSS-REFERENCE TO RELATED APPLICATION

This application claims the priority benefit of Taiwan application serial no. 106138322, filed on Nov. 6, 2017. The entirety of the above-mentioned patent application is hereby incorporated by reference herein and made a part of this specification.

BACKGROUND

Technical Field

The disclosure relates to a network system, a remote server for automatically initializing a network device, and a method for automatically initializing a network device.

Description of Related Art

Generally, a data center is installed with a large number of servers. To ensure that the servers can all be normally operated, an information technology (IT) technician needs to manually perform deployment of the servers. In other words, the IT technician needs to manually set a baseboard management controller (BMC), a basic input/output system (BIOS), a redundant array of independent disks (RAID), network parameters, etc. and perform firmware updating for each of the servers in the data center, which takes a lot of costs of labor and time. Due to this situation, the Zero Touch Provision (ZTP) technique is created.

However, before ZTP is performed, it is still necessary to perform initialization manually. Namely, the IT technician needs to manually check and record a port of a switch to which each server is connected and a media access control address (MAC address) of the BMC of each server and then assign network parameters to the BMC of each server. Then, the IT technician needs to manually perform network setting of each server and record the MAC address of a network interface card (NIC) of each server, before the IT technician can perform deployment of the servers through the ZTP technique. Accordingly, the foregoing ZTP initialization still increases the costs of labor and time.

In addition, since the IT technician needs to manually perform initialization before performing the ZTP, human errors inevitably occur, causing the foregoing ZTP initialization to decrease efficiency.

Therefore, it is necessary to provide a method for auto-matically performing initialization to effectively improve issues of the ZTP.

SUMMARY

Accordingly, a method for automatically initializing a network device, a remote server, and a network system using the method are provided.

An embodiment of the disclosure provides a network system including a switch, a network device, and a remote server. The network device includes a remote management controller and at least one network interface card. The network device is connected to at least one port of the switch. The remote server is connected to the switch via a network and obtains a first port number of a port at which the remote management controller is connected to the switch and a second port number of a port at which the network interface card is connected to the switch. The network device transmits a first discovery packet including an identifier of the remote management controller to the switch, and the switch stores the identifier of the remote management controller and the first port number of the port at which the remote management controller is connected to the switch into a forwarding table. The remote server obtains the forwarding table from the switch. The remote server analyzes the forwarding table according to the first port number of the port at which the remote management controller is connected to the switch to obtain the identifier of the remote management controller, and assigns and transmits a network address of the remote management controller to the remote management controller of the network device according to the identifier of the remote management controller.

In another embodiment, the disclosure provides a remote server including a network connection interface and a processor. The processor is connected to the network connection interface, is connected to a switch through the network connection interface via a network, obtains a first port number of a port at which a remote management controller of a network device is connected to the switch and a second port number of a port at which a network interface card of the network device is connected to the switch, and a forwarding table from the switch. The processor analyzes the forwarding table according to the first port number of the port at which the remote management controller is connected to the switch to obtain an identifier of the remote management controller of the network device, and assigns and transmits a network address of the remote management controller to the remote management controller of the network device according to the identifier of the remote management controller.

An embodiment of the disclosure provides a method for automatically initializing a network device including steps below: obtaining, by a remote server, a first port number of a port at which a remote management controller of a network device is connected to a switch and a second port number of a port at which a network interface card of the network device is connected to the switch; transmitting, by the network device, a first discovery packet including an identifier of the remote management controller of the network device to the switch; storing, by the switch, the identifier of the remote management controller and the first port number of the port at which the remote management controller is connected to the switch into a forwarding table; obtaining, by the remote server, the forwarding table from the switch and analyzing the forwarding table according to the first port number of the port at which the remote management controller is connected to the switch to obtain the identifier of the remote management controller; and assigning and transmitting, by the remote server, a network address of the remote management controller to the remote management controller of the network device according to the identifier of the remote management controller.

In another embodiment, the disclosure provides a method for automatically initializing a network device including steps below: obtaining, by a remote server, a first port number of a port at which a remote management controller of a network device is connected to a switch and a second port number of a port at which a network interface card of the network device is connected to the switch; obtaining, by the remote server, a forwarding table from the switch, wherein the forwarding table includes an identifier of the remote management controller of the network device and the first port number of the port at which the remote management controller is connected to the switch; analyzing, by the remote server, the forwarding table according to the first port number of the port at which the remote management controller is connected to the switch to obtain the identifier of the remote management controller; and assigning and transmitting, by the remote server, a network address of the remote management controller to the remote management controller of the network device according to the identifier of the remote management controller.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Reference will now be made to the drawings to describe embodiments of a method for automatically initializing a network device, a remote server, and a network system using this method. For clarity and ease of illustration of the drawings, sizes and proportions of the components in drawings may be enlarged or reduced in presentation. In the description and/or claims below, when a component is described to "connect" or "couple" to another component, it may be regarded as directly connecting or coupling to the another component or an intervening component may exist, and when a component is described to "directly connect" or "directly couple" to another component, an intervening component does not exist. Other terms for describing relations among components or layers shall be interpreted in the same manner. To facilitate comprehension, in the embodiments below, the same components are labeled with the same reference numerals in the description.

Figure 1:
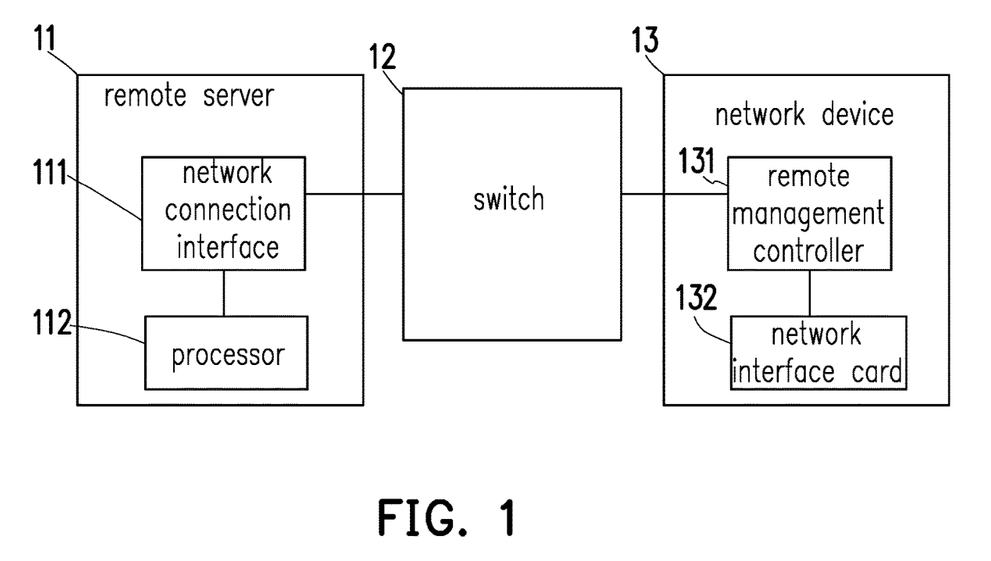
FIG. 1 is a block schematic diagram illustrating a remote server for automatically initializing a network device according to a first embodiment of the disclosure.

FIG. 1 is a block schematic diagram illustrating a remote server for automatically initializing a network device according to a first embodiment of the disclosure. Referring to FIG. 1, a remote server 11 includes a network connection interface 111 and a processor 112. In another embodiment, the remote server 11 may be another different computer device, e.g., a physical server. Alternatively, the remote server 11 may also be an application program of one of virtual machines operated in a server.

The processor 112 is connected to the network connection interface 111. The processor 112 is connected to a switch 12 through the network connection interface 111 via a network.

A network device 13 is, for example, a client end server, including a remote management controller 131 and at least one network interface card (NIC) 132. When at least one new network device 13 is connected to at least one port of the switch 12, the remote server 11 learns/obtains in advance a first port number of a port at which the remote management controller 131 of the network device 13 is connected to the switch 12, and learns/obtains in advance a second port number of a port at which the NIC 132 of the network device 13 is connected to the switch 12. In an embodiment, the remote management controller 131 and the NIC 132 of the network device 13 are respectively connected to different ports of the switch 12. Therefore, the first port number of the port at which the remote management controller 131 is connected to the switch 12 and the second port number of the port at which the NIC 132 is connected to the switch 12 are different. In another embodiment, the network device 13 has a share port function, and the network device 13 may configure the remote management controller 131 and the NIC 132 to be connected to the switch 12 via the same port. In that case, the first port number of the port at which the remote management controller 131 is connected to the switch 12 and the second port number of the port at which the NIC 132 is connected to the switch 12 are identical. The remote server 11 automatically initializes the network device 13 connected to the switch 12.

In another embodiment, the network device 13 may be another different computer device, e.g., a physical server. Specifically, the remote management controller 131 executes commands of the remote server 11. Therefore, the remote server 11 can remotely manage the network device 13. The remote management controller 131 makes it possible to perform operations such as monitoring or updating the network device 13 with the network device 13 being in an off state. The embodiments of the disclosure do not limit the specific implementation mode of the remote management controller 131, as long as the remote server 11 can remotely manage, monitor, and configure the remote management controller 131 of the network device 13. The remote management controller 131 is, for example, a baseboard management controller (BMC).

However, how to enable the remote server 11 to automatically set a network address (i.e., an IP address) of the remote management controller 131 of the network device 13 for automatically initializing the network device 13 will be elaborated in subsequent embodiments.

The remote server 11 automatically initializes the network device 13. After initialization is completed, the remote server 11 automatically performs operations for the network device 13, including parameter setting of the remote management controller 131, parameter setting of a basic input/output system (BIOS), parameter setting of a redundant array of independent disks (RAID), parameter setting of firmware, deployment of network parameters, firmware updating, etc. Automatic initialization of the present embodiment includes two stages. The first stage is an automatic mapping procedure, and the second stage is an automatic pre-configuration procedure.

The automatic mapping procedure enables the remote server 11 to automatically obtain an identifier of the remote management controller 131 of the network device 13 and to assign a network address of the remote management controller 131 of the network device 13 to the remote management controller 131 of the network device 13.

First, after the network device 13 is connected to the switch 12, the processor 112 of the remote server 11 learns/obtains in advance a preset first port number of a port at which the remote management controller 131 of the network device 13 is connected to the switch 12. Alternatively, an IT technician or manager notifies the remote server 11 of the first port number of the port at which the network device 13 is connected to the switch 12.

When the network device 13 is connected to the switch 12, the remote management controller 131 of the network device 13 broadcasts a first discovery packet including an identifier of the remote management controller 131.

After the switch 12 receives the first discovery packet including the identifier of the remote management controller 131, the switch 12 stores the identifier of the remote management controller 131 and the first port number of the port at which the remote management controller 131 of the network device 13 is connected to the switch 12 into a forwarding table.

The processor 112 of the remote server 11 obtains the forwarding table from the switch 12. According to the first port number of the port at which the remote management controller 131 is connected to the switch 12 as learned/obtained in advance, the processor 112 looks up or analyzes the forwarding table to obtain the identifier of the remote management controller 131. Then, according to the identifier of the remote management controller 131, the processor 112 of the remote server 11 assigns a network address of the remote management controller 131, and transmits the network address of the remote management controller 131 to the remote management controller 131 of the network device 13 to set the network address of the remote management controller 131. Specifically, the remote server 11 assigns a static IP address to the remote management controller 131, or assigns the network address of the remote management controller 131 according to the Dynamic Host Configuration Protocol (DHCP). In an embodiment, the identifier of the remote management controller 131 is a media access control address (MAC address) of the remote management controller 131.

In the present exemplary embodiment, the processor 112 is configured to control overall operation of the remote server 11. The processor 112 is, for example, a central processing unit (CPU), a programmable microprocessor, digital signal processor (DSP), programmable controller, application specific integrated circuit (ASIC), programmable logic device (PLD), or another similar device, and the disclosure is not limited hereto.

In an exemplary embodiment, the network connection interface 111 is a network module, such that the remote server 11 can communicate with external entities through any known and/or unknown communication protocol networks. The network connection interface 111 includes, for example, one or more network adapter cards, wired NICs, and wireless NICs, such as a WiFi interface or any other wireless communication protocols (e.g., 2G, 3G, 3.5G, 4G, and LTE, and the disclosure is not limited hereto). The switch 12 is a hardware or software device configured to transmit data from one network host to another network host and is, for example, a switch, a bridge, a router, or a gateway, among others.

Through the foregoing automatic mapping procedure, the remote server 11 automatically assigns the network address to the remote management controller 131 of the network device 13 without manual setting and thus reduces the costs of labor and time in initialization.

The automatic pre-configuration procedure enables the remote server 11 to automatically set the network device 13 and record an identifier of the NIC 132 of the network device 13.

First, according to the network address assigned to the remote management controller 131, the processor 112 of the remote server 11 controls the remote management controller 131 via the network to boot the network device 13.

After the network device 13 is booted, the network device 13 broadcasts/transmits a second discovery packet including the identifier of the NIC 132 of the network device 13 through the NIC 132. After the switch 12 receives the second discovery packet including the identifier of the NIC 132, the switch 12 stores the identifier of the NIC 132 and a second port number of a port at which the NIC 132 is connected to the switch 12 into the forwarding table.

In an embodiment, through a network booting mechanism of a Preboot Execution Environment (PXE), the network device 13 is booted by the remote server 11, and then the network device 13 sends or broadcasts the second discovery packet to the switch 12.

The processor 112 of the remote server 11 obtains the forwarding table from the switch 12. According to the second port number of the port at which the NIC 132 is connected to the switch 12 as learned/obtained in advance, the processor 112 looks up or analyzes the forwarding table to obtain the identifier of the NIC 132. In an embodiment, the remote server 11 stores the identifier of the NIC 132. The identifier of the NIC 132 is, for example, a MAC address of the NIC 132. Specifically, the first port number of the port at which the remote management controller 131 of the network device 13 is connected to the switch 12 and the second port number of the port at which the NIC 132 is connected to the switch 12 may be the same or different port numbers.

Of course, the description above is merely an example, and the structure and function of the remote server 11 may be changed according to the actual needs, and the disclosure is not limited hereto.

Through the foregoing automatic pre-configuration procedure, the remote server 11 records the identifier of the NIC 132 of the network device 13 without manual setting to further automatically set the network device 13 and thus reduces the costs of labor and time in initialization.

Figure 2:
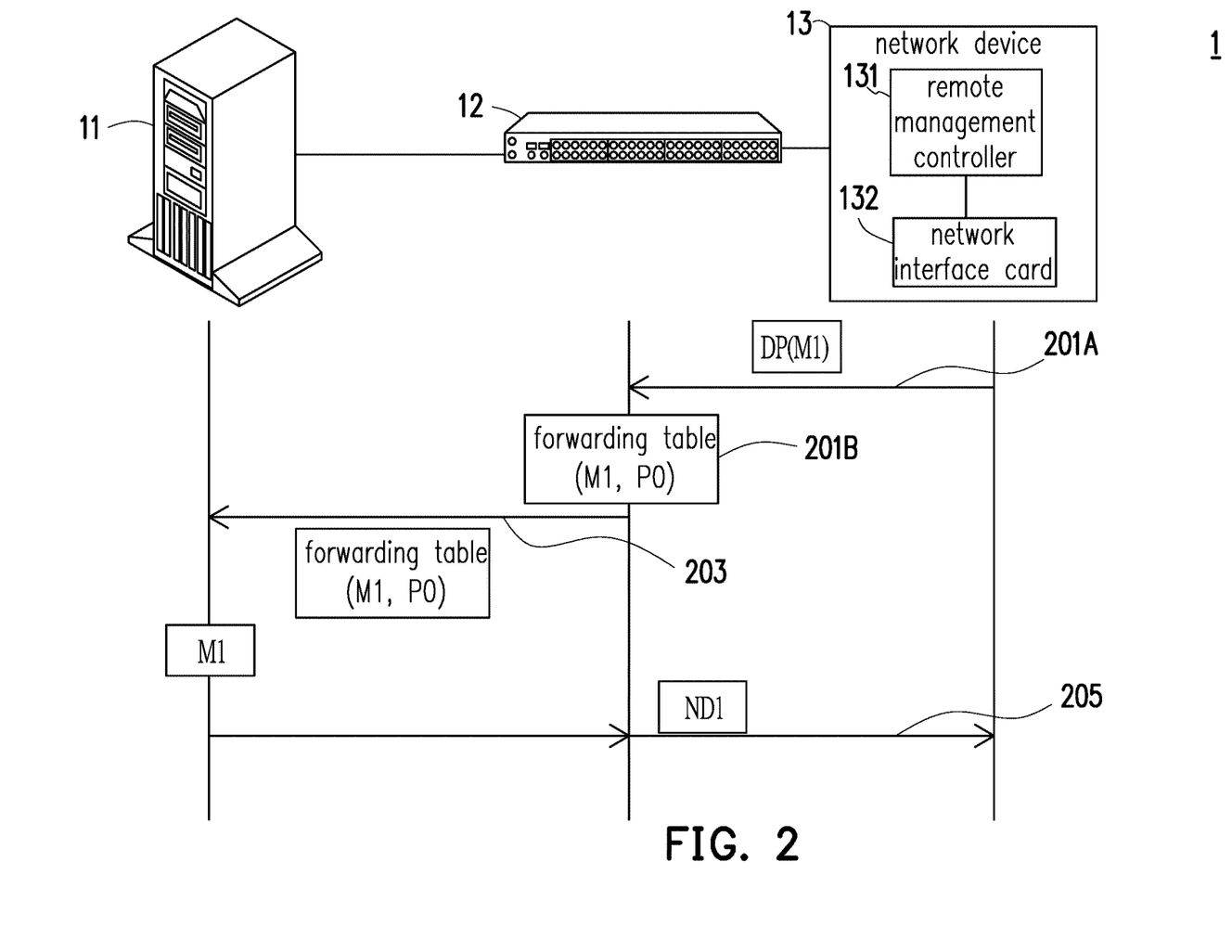
FIG. 2 is a schematic diagram illustrating a network system for automatically initializing a network device according to the first embodiment of the disclosure.

FIG. 2 is a schematic diagram illustrating a network system for automatically initializing a network device according to the first embodiment of the disclosure. Referring to FIG. 2, a network system 1 of the present embodiment includes a remote server 11, a switch 12, and a network device 13. The network system 1 may include a plurality of network devices 13. However, to clearly illustrate the technical features of the present embodiment, only one network device 13 is illustrated in the present embodiment. An automatic mapping procedure will be detailed below.

The remote server 11 is connected to the switch 12 via a network.

The network device 13 includes a remote management controller 131. The remote management controller 131 of the network device 13 is connected to a port of the switch 12. The remote server 11 learns/obtains a first port number of the port at which the remote management controller 131 of the network device 13 is connected to the switch 12. In the present embodiment, the network device 13 is, for example, a client end server.

The network system 1 executes the automatic mapping procedure to enable the remote server 11 to automatically assign a network address of the remote management controller 131 to the remote management controller 131 of the network device 13.

In step 201A, the remote management controller 131 of the network device 13 generates a first discovery packet DP including an identifier M1 of the remote management controller 131. The network device 13 transmits or broadcasts the first discovery packet DP to the switch 12. Specifically, the first discovery packet DP is, for example, a Bootstrap Protocol (BootP) packet or a DHCP packet. The BootP packet and the DHCP packet are conventional art and are thus not repeatedly described here.

Then, in step 201B, the switch 12 stores the identifier M1 of the remote management controller 131 and a first port number P0 of the port at which the remote management controller 131 of the network device 13 is connected to the switch 12 into a forwarding table. Then, in step 203, the remote server 11 obtains the forwarding table from the switch 12. According to the first port number P0 of the port at which the remote management controller 131 of the network device 13 is connected to the switch 12 as learned/obtained in advance, the remote server 11 analyzes the forwarding table to obtain the identifier M1 of the remote management controller 131. In an embodiment, the remote server 11 stores the identifier M1 of the remote management controller 131.

In step 205, the remote server 11 assigns and transmits a network address ND1 of the remote management controller 131 to the remote management controller 131 of the network device 13 according to the identifier M1 of the remote management controller 131. Specifically, the identifier M1 of the remote management controller 131 is, for example, a MAC address of the remote management controller 131.

Through the foregoing automatic mapping procedure, the remote server 11 automatically assigns the network address ND1 of the remote management controller 131 to the remote management controller 131 of the network device 13. Specifically, the present embodiment does not limit the specific implementation mode of the remote management controller 131, as long as the remote server 11 can remotely manage, monitor, and configure the remote management controller 131 of the network device 13. The remote management controller 131 is, for example, a baseboard management controller (BMC).

Of course, the description above is merely an example, and the structure and function of the network system 1 may be changed according to the actual needs, and the disclosure is not limited hereto.

Figure 3:
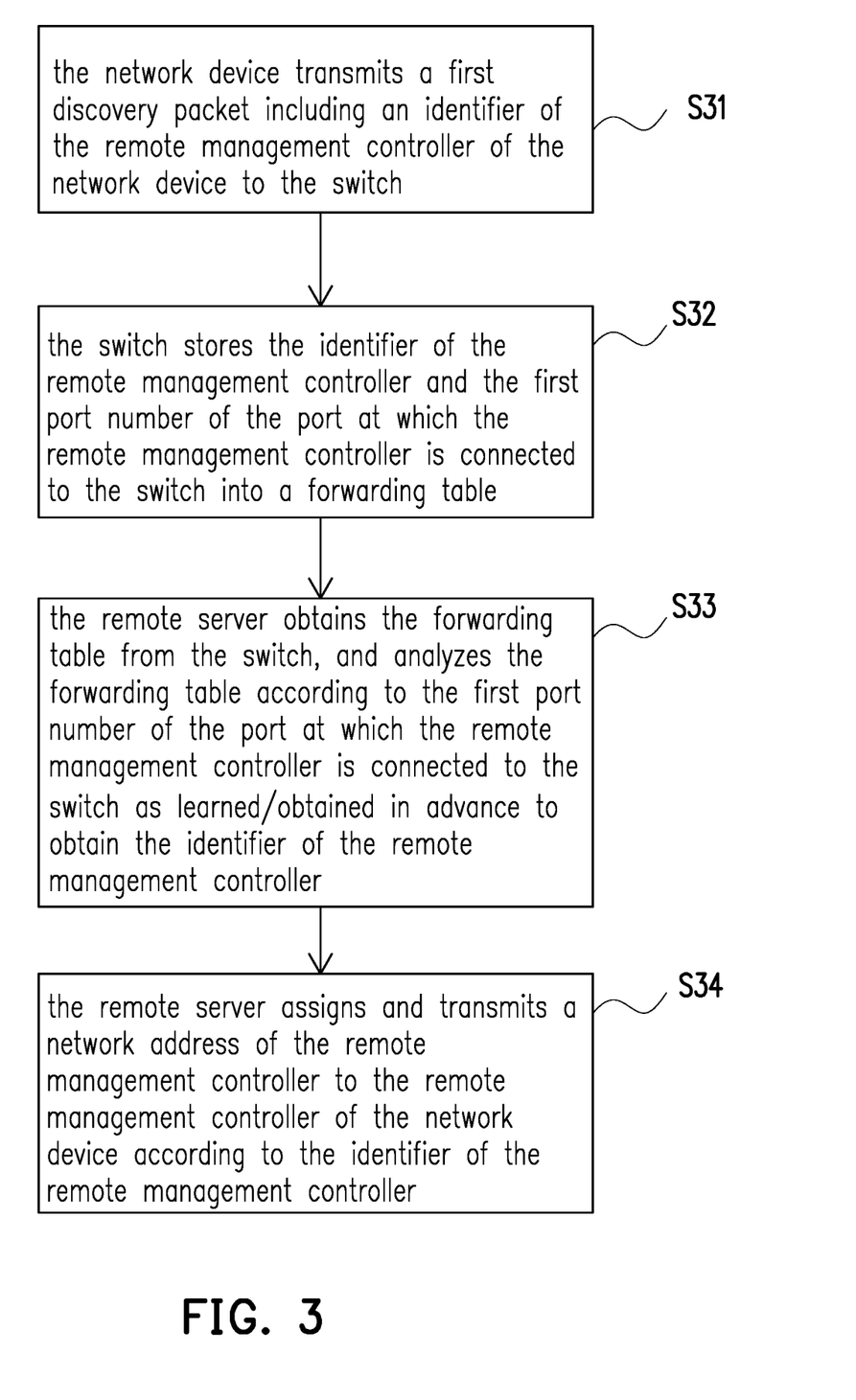
FIG. 3 is a flowchart illustrating a method for automatically initializing a network device according to the first embodiment of the disclosure.

FIG. 3 is a flowchart illustrating a method for automatically initializing a network device according to the first embodiment of the disclosure. Referring to FIG. 3, an example is provided to illustrate steps of an automatic mapping procedure of the method for automatically initializing a network device of the present embodiment. In the method for automatically initializing a network device according to the first embodiment, the remote server learns/obtains in advance a first port number of a port at which the remote management controller of the network device is connected to the switch, and learns/obtains in advance a second port number of a port at which the NIC of the network device is connected to the switch. The automatic mapping procedure of the present embodiment further includes the following steps.

In step S31, the network device transmits a first discovery packet including an identifier of the remote management controller of the network device to the switch. Specifically, the first discovery packet is, for example, a BootP packet or a DHCP packet.

In step S32, the switch stores the identifier of the remote management controller and the first port number of the port at which the remote management controller is connected to the switch into a forwarding table.

In step S33, the remote server obtains the forwarding table from the switch, and analyzes the forwarding table according to the first port number of the port at which the remote management controller is connected to the switch as learned/obtained in advance to obtain the identifier of the remote management controller.

In step S34, the remote server assigns and transmits a network address of the remote management controller to the remote management controller of the network device according to the identifier of the remote management controller. Specifically, the identifier of the remote management controller is, for example, a MAC address of the remote management controller.

Figure 4:
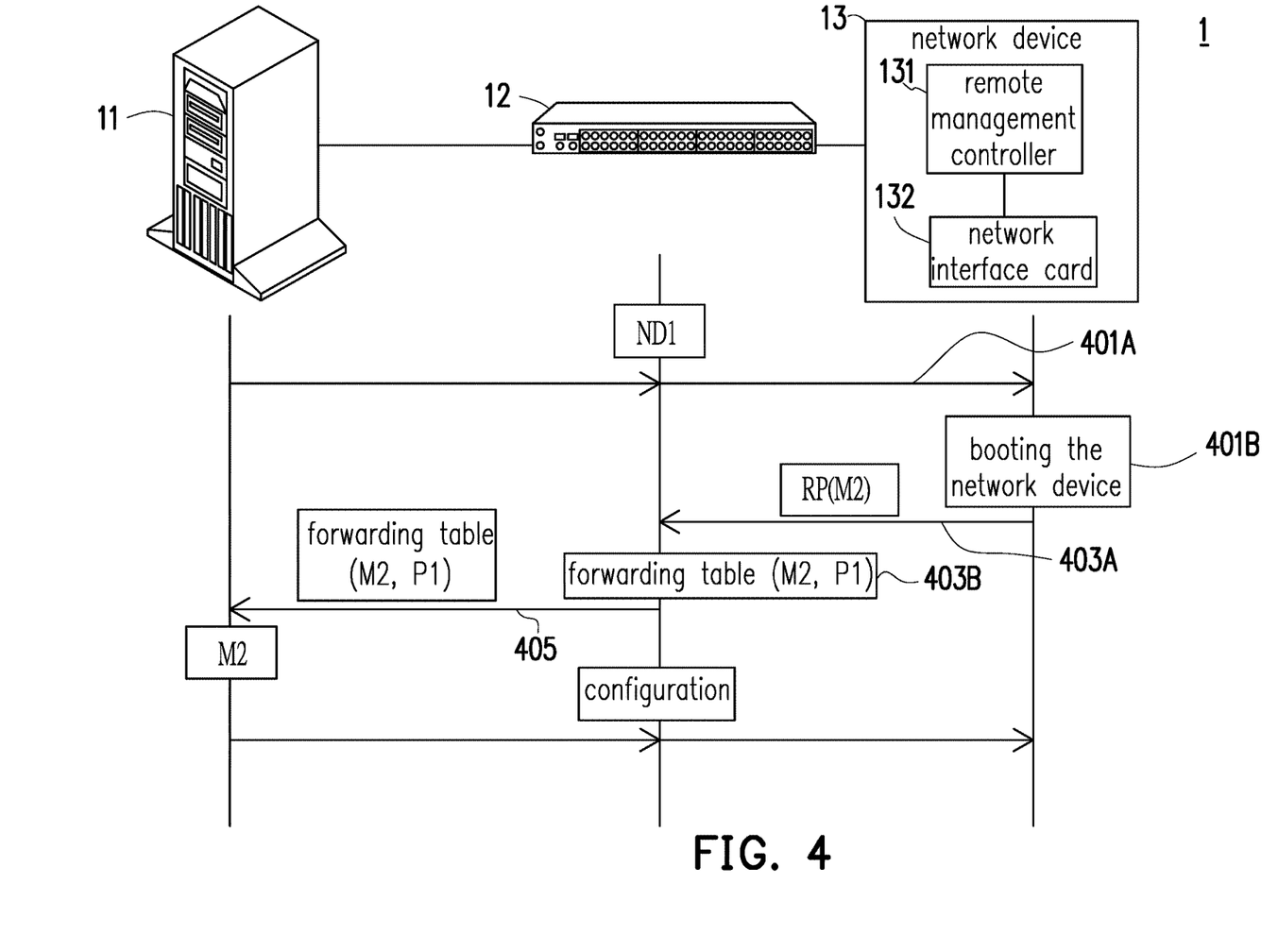
FIG. 4 is a schematic diagram illustrating a network system for automatically initializing a network device according to a second embodiment of the disclosure.

FIG. 4 is a schematic diagram illustrating a network system for automatically initializing a network device according to a second embodiment of the disclosure. Referring to FIG. 4, a network system 1 of the present embodiment includes a remote server 11, a switch 12, and a network device 13. The network system 1 may include a plurality of network devices 13. However, to clearly illustrate the technical features of the present embodiment, only one network device 13 is illustrated in the present embodiment.

The remote server 11 is connected to the switch 12 via a network.

The network device 13 includes a remote management controller 131 and a NIC 132. The remote management controller 131 and the NIC 132 of the network device 13 are connected to ports of the switch 12. In the present embodiment, the network device 13 is, for example, a client end server.

After executing the automatic mapping procedure of the previous embodiment, the network system 1 further executes an automatic pre-configuration procedure to complete the entire automatic initialization. The automatic pre-configuration procedure will be detailed below.

In step 401A, according to the network address ND1 assigned to the remote management controller 131, the remote server 11 is connected to the network device 13 via the network. Accordingly, the remote server 11 can control the remote management controller 131 via the network to boot the network device 13, as shown in step 401B.

In step 403A, after the network device 13 is booted, the network device 13 transmits or broadcasts a second discovery packet RP including an identifier M2 of the NIC 132 of the network device 13 to the switch 12. Specifically, the second discovery packet RP is, for example, a BootP packet or a DHCP packet. In an embodiment, through a network booting mechanism of a Preboot Execution Environment (PXE), the network device 13 is booted by the remote server 11, and then the network device 13 sends or broadcasts the second discovery packet RP to the switch 12.

In step 403B, the switch 12 stores the identifier M2 of the NIC 132 and a second port number P1 of the port at which the NIC 132 is connected to the switch 12 into a forwarding table. Specifically, the first port number P0 of the port at which the remote management controller 131 is connected to the switch 12 and the second port number P1 of the port at which the NIC 132 is connected to the switch 12 may be the same or different port numbers.

As shown in step 405, the remote server 11 obtains the forwarding table from the switch 12. According to the second port number P1 of the port at which the NIC 132 of the network device 13 is connected to the switch 12 as learned/obtained in advance, the remote server 11 analyzes the forwarding table to obtain the identifier M2 of the NIC 132 of the network device 13 and stores the identifier M2 of the NIC 132 of the network device 13.

Specifically, the present embodiment does not limit the specific implementation mode of the remote management controller 131, as long as the remote server 11 can remotely manage, monitor, and configure the remote management controller 131 of the network device 13. The remote management controller 131 is, for example, a baseboard management controller (BMC).

According to the first embodiment and the second embodiment above, the automatic initialization operation of the present embodiment includes two stages. The first stage is the automatic mapping procedure, and the second stage is the automatic pre-configuration procedure. After the foregoing automatic initialization is completed, the remote server 11 can further configure each network device 13. For example, the remote server 11 may perform operations for the network devices 13, including parameter setting of the remote management controller, parameter setting of a basic input/output system (BIOS), parameter setting of a redundant array of independent disks (RAID), deployment of network parameters, firmware updating, etc. Accordingly, the automatic initialization of the present embodiment does reduce the costs of labor and time in initialization.

Of course, the description above is merely an example, and the structure of the network system 1 and the steps of the automatic initialization executed by the network system 1 may all be changed according to the actual needs, and the disclosure is not limited hereto.

It is noted that, conventionally, before Zero Touch Provision (ZTP) is performed, initialization is generally performed manually. Namely, the IT technician needs to manually check and record the MAC address of the remote management controller of each network device, and then assign network parameters to each server or the remote management controller of the network device. Then, the IT technician needs to manually perform network setting of each network device and record the MAC address of the NIC of each network device, before he or she can perform deployment of the servers through the ZTP technique. Conversely, according to the embodiments of the disclosure, the remote server executes the automatic mapping procedure to automatically obtain the identifier (e.g., a MAC address) of the remote management controller of each network device and assign different network addresses (e.g., IP addresses) to the remote management controller of each network device. Moreover, the remote server executes the automatic pre-configuration procedure to record the identifier (e.g., a MAC address) of the NIC of each network device and automatically set each network device, which thus reduces the costs of labor and time.

In addition, since initialization is conventionally manually performed before the ZTP is performed, human errors inevitably occur and decrease efficiency. Conversely, according to the embodiments of the disclosure, the remote server realizes automatic initialization based on bare metal, which thus prevents occurrence of human errors and further enhances initialization efficiency.

Furthermore, in an embodiment of the disclosure, through the automatic pre-configuration procedure, the remote server obtains the identifier (e.g., a MAC address) of the NIC of the network device(s). In other words, before the network device(s) loads a Disposable Operation System (OS), the remote server can obtain the identifier (e.g., a MAC address) of the NIC of the network device(s). Therefore, the embodiments described in the disclosure can further enhance the initialization efficiency. Accordingly, the disclosure does improve efficiency in the related art.

Figure 5:
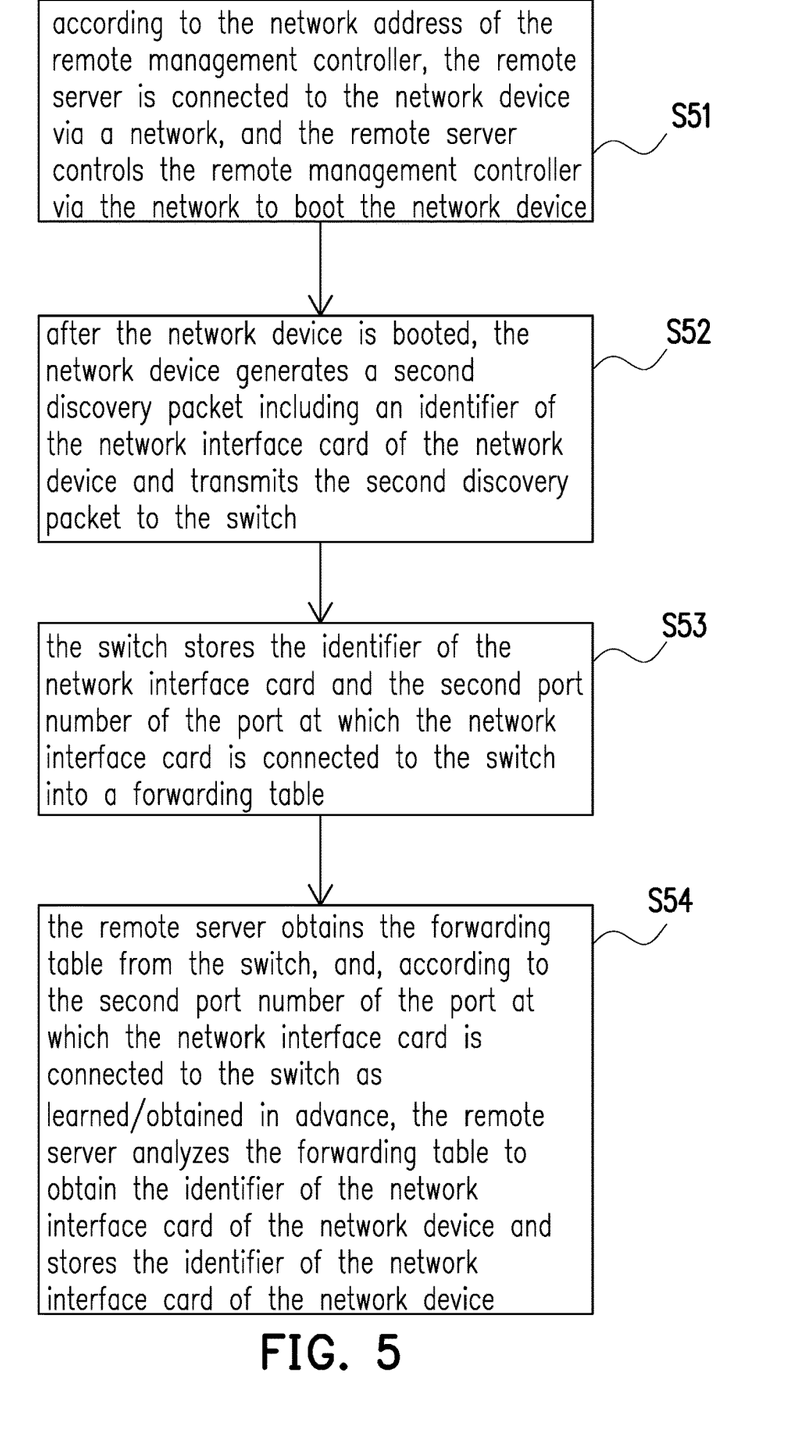
FIG. 5 is a flowchart illustrating a method for automatically initializing a network device according to the second embodiment of the disclosure.

FIG. 5 is a flowchart illustrating a method for automatically initializing a network device according to the second embodiment of the disclosure. Referring to FIG. 5, an example is provided to illustrate steps of an automatic pre-configuration procedure of the method for automatically initializing a network device of the present embodiment. In the method for automatically initializing a network device according to the second embodiment, the remote server learns/obtains in advance a second port number of a port at which the NIC of the network device is connected to the switch. The automatic pre-configuration procedure of the present embodiment further includes the following steps.

In step S51, according to the network address (e.g., an IP address) of the remote management controller, the remote server is connected to the network device via a network. The remote server controls the remote management controller via the network to boot the network device.

In step S52, after the network device is booted, the network device generates a second discovery packet including an identifier (e.g., a MAC address) of the NIC of the network device and transmits the second discovery packet to the switch.

In step S53, the switch stores the identifier of the NIC and the second port number of the port at which the NIC is connected to the switch into a forwarding table.

In step S54, the remote server obtains the forwarding table from the switch, and, according to the second port number of the port at which the NIC is connected to the switch as learned/obtained in advance, the remote server analyzes the forwarding table to obtain the identifier of the NIC of the network device and stores the identifier of the NIC of the network device.

In summary of the above, according to the embodiments of the disclosure, the remote server executes the automatic mapping procedure to automatically obtain the identifier (e.g., a MAC address) of the remote management controller of each network device and assign different network addresses (e.g., IP addresses) to the remote management controller of each network device.

Moreover, according to the embodiments of the disclosure, the remote server executes the automatic pre-configuration procedure to record the identifier (e.g., a MAC address) of the NIC of each network device to automatically set each network device, which thus further reduces the costs of labor and time.

Although the embodiments are already disclosed as above, these embodiments should not be construed as limitations on the scope of the disclosure. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A network system comprising:
    a switch;
    a network device comprising a remote management controller and at least one network interface card, wherein the network device is connected to at least one port of the switch; and
    a remote server connected to the switch via a network and obtaining a first port number of a port at which the remote management controller is connected to the switch and a second port number of a port at which the network interface card is connected to the switch,
    wherein the network device transmits a first discovery packet comprising an identifier of the remote management controller to the switch, and the switch stores the identifier of the remote management controller and the first port number of the port at which the remote management controller is connected to the switch into a forwarding table, wherein the remote server obtains the forwarding table from the switch, analyzes the forwarding table according to the first port number of the port at which the remote management controller is connected to the switch to obtain the identifier of the remote management controller, and assigns and transmits a network address of the remote management controller to the remote management controller of the network device according to the identifier of the remote management controller.

2. The network system according to claim 1, wherein the remote server is connected to the network device according to the network address of the remote management controller, the remote server boots the network device through the remote management controller, and, after booting, the network device transmits a second discovery packet comprising an identifier of the network interface card of the network device to the switch.

3. The network system according to claim 2, wherein the network device transmits the second discovery packet to the switch through a network booting mechanism of a Preboot Execution Environment.

4. The network system according to claim 2, wherein the switch stores the identifier of the network interface card and the second port number of the port at which the network interface card is connected to the switch into the forwarding table, and the remote server obtains the forwarding table from the switch and analyzes the forwarding table according to the second port number of the port at which the network interface card is connected to the switch to obtain and store the identifier of the network interface card of the network device.

5. The network system according to claim 2, wherein the identifier of the network interface card of the network device is a media access control address of the network interface card, and the identifier of the remote management controller is a media access control address of the remote management controller.

6. The network system according to claim 2, wherein the first discovery packet and the second discovery packet are respectively a Bootstrap Protocol packet or a Dynamic Host Configuration Protocol packet.

7. The network system according to claim 1, wherein the first port number of the port at which the remote management controller is connected to the switch and the second port number of the port at which the network interface card is connected to the switch are same or different port numbers.

8. The network system according to claim 1, wherein the remote management controller is a baseboard management controller.

9. A remote server comprising:
a network connection interface; and
a processor connected to the network connection interface, connected to a switch through the network connection interface via a network, obtaining a first port number of a port at which a remote management controller of a network device is connected to the switch and a second port number of a port at which a network interface card of the network device is connected to the switch, and a forwarding table from the switch,
wherein the processor analyzes the forwarding table according to the first port number of the port at which the remote management controller is connected to the switch to obtain an identifier of the remote management controller of the network device, and assigns and transmits a network address of the remote management controller to the remote management controller of the network device according to the identifier of the remote management controller.

10. The remote server according to claim 9, wherein the processor is connected to the network device according to the network address of the remote management controller, the processor boots the network device through the remote management controller, the network interface card of the network device transmits a discovery packet comprising an identifier of the network interface card to the switch, and the processor obtains the forwarding table from the switch, wherein the forwarding table comprises the identifier of the network interface card and the second port number of the port at which the network interface card is connected to the switch.

11. The remote server according to claim 10, wherein the processor analyzes the forwarding table according to the second port number of the port at which the network interface card is connected to the switch to obtain and store the identifier of the network interface card of the network device.

12. The remote server according to claim 10, wherein the identifier of the network interface card of the network device is a media access control address of the network interface card.

13. The remote server according to claim 9, wherein the identifier of the remote management controller is a media access control address of the remote management controller.

14. The remote server according to claim 9, wherein the first port number of the port at which the remote management controller is connected to the switch and the second port number of the port at which the network interface card is connected to the switch are same or different port numbers.

15. The remote server according to claim 9, wherein the remote management controller is a baseboard management controller.

16. A method for automatically initializing a network device, comprising steps below:
obtaining, by a remote server, a first port number of a port at which a remote management controller of a network device is connected to a switch and a second port number of a port at which a network interface card of the network device is connected to the switch;
transmitting, by the network device, a first discovery packet comprising an identifier of the remote management controller of the network device to the switch;
storing, by the switch, the identifier of the remote management controller and the first port number of the port at which the remote management controller is connected to the switch into a forwarding table;
obtaining, by the remote server, the forwarding table from the switch and analyzing the forwarding table according to the first port number of the port at which the remote management controller is connected to the switch to obtain the identifier of the remote management controller; and
assigning and transmitting, by the remote server, a network address of the remote management controller to the remote management controller of the network device according to the identifier of the remote management controller.

17. The method for automatically initializing a network device according to claim 16, further comprising steps below:
  connecting, by the remote server, to the network device according to the network address of the remote management controller, and booting the network device through the remote management controller; and
  transmitting, by the network device, a second discovery packet comprising an identifier of the network interface card of the network device to the switch, after booting the network device.

18. The method for automatically initializing a network device according to claim 17, further comprising a step below:
  generating, by the network device, the second discovery packet through a network booting mechanism of a Preboot Execution Environment.

19. The method for automatically initializing a network device according to claim 17, further comprising steps below:
  storing, by the switch, the identifier of the network interface card and the second port number of the port at which the network interface card is connected to the switch into the forwarding table; and
  obtaining, by the remote server, the forwarding table from the switch and analyzing the forwarding table according to the second port number of the port at which the network interface card is connected to the switch to obtain and store the identifier of the network interface card of the network device.

20. The method for automatically initializing a network device according to claim 17, wherein the identifier of the network interface card of the network device is a media access control address of the network interface card, and the identifier of the remote management controller is a media access control address of the remote management controller.

21. The method for automatically initializing a network device according to claim 17, wherein the first discovery packet and the second discovery packet are respectively a Bootstrap Protocol packet or a Dynamic Host Configuration Protocol packet.

22. The method for automatically initializing a network device according to claim 16, wherein the first port number of the port at which the remote management controller is connected to the switch and the second port number of the port at which the network interface card is connected to the switch are same or different port numbers.

23. The method for automatically initializing a network device according to claim 16, wherein the remote management controller is a baseboard management controller.

24. A method for automatically initializing a network device, comprising steps below:
  obtaining, by a remote server, a first port number of a port at which a remote management controller of a network device is connected to a switch and a second port number of a port at which a network interface card of the network device is connected to the switch;
  obtaining, by the remote server, a forwarding table from the switch, wherein the forwarding table comprises an identifier of the remote management controller of the network device and the first port number of the port at which the remote management controller is connected to the switch;
  analyzing, by the remote server, the forwarding table according to the first port number of the port at which the remote management controller is connected to the switch to obtain the identifier of the remote management controller; and
  assigning and transmitting, by the remote server, a network address of the remote management controller to the remote management controller of the network device according to the identifier of the remote management controller.

25. The method for automatically initializing a network device according to claim 24, further comprising steps below:
  connecting, by the remote server, to the network device according to the network address of the remote management controller, and booting the network device through the remote management controller; and
  transmitting, by the network interface card of the network device, a discovery packet comprising an identifier of the network interface card to the switch after booting the network device, and obtaining, by the remote server, the forwarding table from the switch, wherein the forwarding table comprises the identifier of the network interface card and the second port number of the port at which the network interface card is connected to the switch.

26. The method for automatically initializing a network device according to claim 25, further comprising a step below:
  generating, by the network device, the discovery packet through a network booting mechanism of a Preboot Execution Environment.

27. The method for automatically initializing a network device according to claim 25, further comprising a step below:
  analyzing, by the remote server, the forwarding table according to the second port number of the port at which the network interface card is connected to the switch to obtain and store the identifier of the network interface card of the network device.

28. The method for automatically initializing a network device according to claim 25, wherein the identifier of the network interface card of the network device is a media access control address of the network interface card.

29. The method for automatically initializing a network device according to claim 24, wherein the identifier of the remote management controller is a media access control address of the remote management controller.

30. The method for automatically initializing a network device according to claim 24, wherein the first port number of the port at which the remote management controller is connected to the switch and the second port number of the port at which the network interface card is connected to the switch are same or different port numbers.

31. The method for automatically initializing a network device according to claim 24, wherein the remote management controller is a baseboard management controller.

* * * * *